(No Model.) 2 Sheets—Sheet 1.
E. THOMSON.
CONTROLLING ELECTRIC ARCS.
No. 571,463. Patented Nov. 17, 1896.
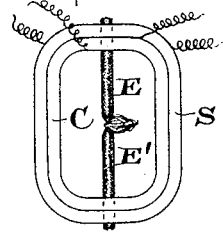
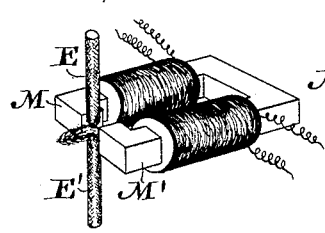
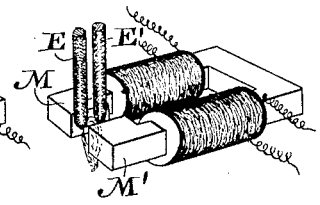
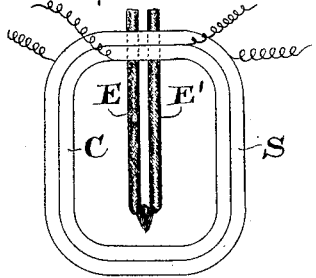
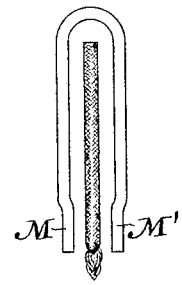
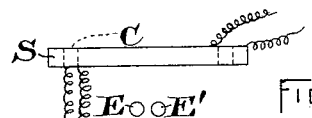
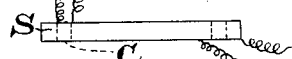
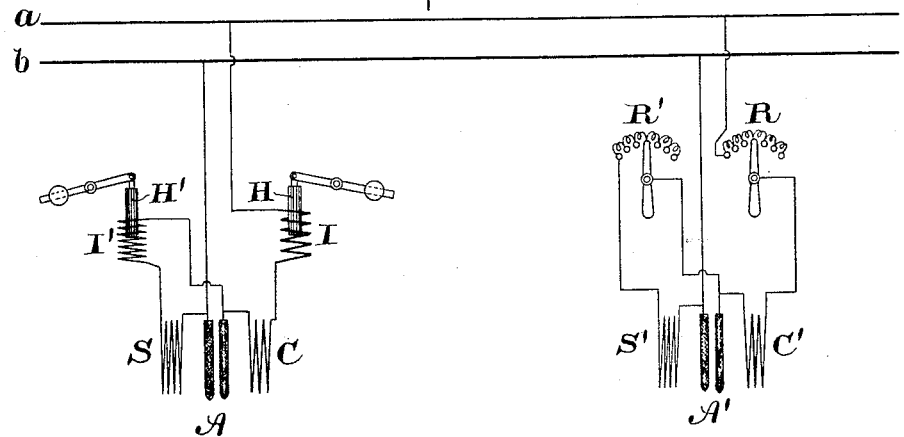
WITNESSES
Henry C. Westendarp.
B. B. Hull.
INVENTOR
Elihu Thomson,
by Geo. R. Blodgett,
atty (No Model.) 2 Sheets—Sheet 2.
E. THOMSON.
CONTROLLING ELECTRIC ARCS.
No. 571,463. Patented Nov. 17, 1896.
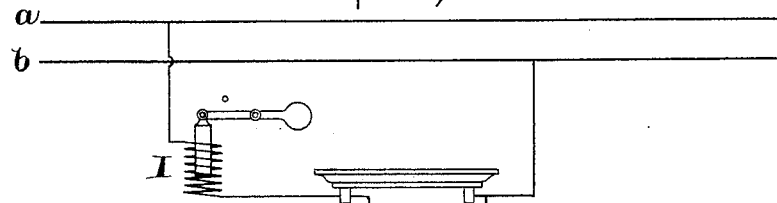
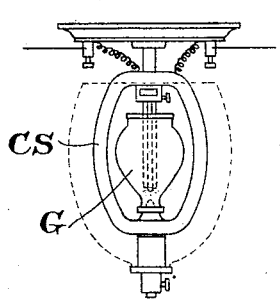
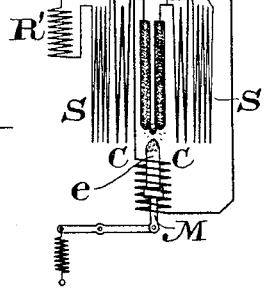
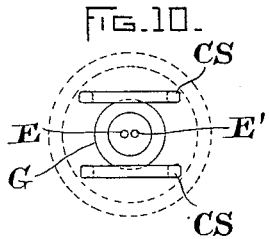
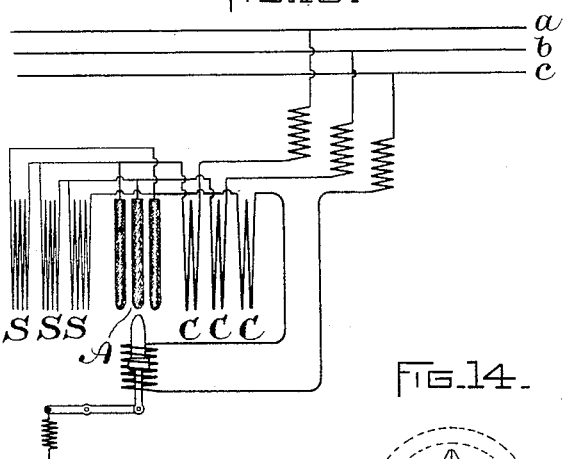
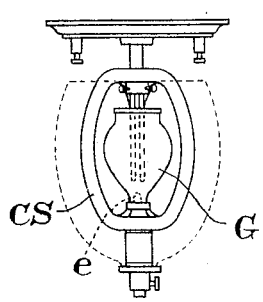
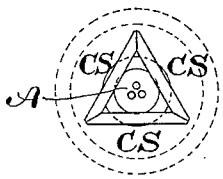
WITNESSES
Harry O. Westendarp
B. B. Hull.
INVENTOR
Elihu Thomson,
Geo. R. Blodgett,
atty.

UNITED STATES PATENT OFFICE.

ELIHU THOMSON, OF SWAMPSCOTT, MASSACHUSETTS, ASSIGNOR TO THE GENERAL ELECTRIC COMPANY, OF NEW YORK.

CONTROLLING ELECTRIC ARCS.

SPECIFICATION forming part of Letters Patent No. 571,463, dated November 17, 1896.

Application filed June 26, 1896. Serial No. 597,031. (No model.)

*To all whom it may concern:*

Be it known that I, ELIHU THOMSON, a citizen of the United States, residing at Swampscott, in the county of Essex, State of Massachusetts, have invented certain new and useful Improvements in Controlling Electric Arcs, (Case No. 409,) of which the following is a specification.

My invention relates to that class of electric lamps in which an arc is formed between two carbon pencils, the arc being maintained in a definite position with respect to the axis of the carbons by the influence of a coil or magnet near thereto.

It is well known that a magnetic field will displace an arc formed between two electrodes whether those electrodes are in the same line or at an angle or parallel, as in the Jablochkoff candle, or whether alternating or direct currents are used to maintain the field. In my present invention, however, I use a compound field for acting upon the arc. To this end I employ two sources of electromagnetism, one rising and falling with the current traversing the arc and the other rising and falling with the potential difference between the carbons or electrodes producing it—that is, I may use a coil in series with the arc or a coil the current in which is controlled by the series current, either directly or indirectly. I may also use in conjunction with the former coil an electromagnetic coil in shunt to the arc, the latter coil of fine wire and comparatively high resistance, the electromagnetic effect being opposed to that of the former coil. I may instead of this employ a magnetic coil responsive to differences of potential and the current in which is controlled by such differences of potential of the two electrodes.

Figures 1, 2, 3, and 4 are diagrams showing various forms of my invention. Figs. 5 and 6 are merely illustrative. Fig. 7 is a plan view of the parts shown in Fig. 4. Fig. 8 shows circuit arrangements. Figs. 9, 10, and 11 show the application of my invention to a special form of lamp. Figs. 12, 13, and 14 are diagrams of circuit arrangements in a three-phase lamp.

In Fig. 1 two carbons E E' are shown placed in any desired relation, as in a vertical line, with the arc drawn between them. An electromagnetic coil in the form of a hollow four-sided figure is made up of two coils closely wound together, one of which, the inner coil, (marked C,) may be placed in series with the arc or be traversed by a current depending thereon, and the other, S, is placed in shunt, or carries a current depending upon the potential difference. The deflective action of the coil C may be such as to throw the arc to the right, as indicated in the figure, while that of the coil S may be to throw it to the left. By properly adjusting the electromagnetic power of the two coils any desired position or displacement of the arc may be obtained without risk of its becoming excessive. If the arc should become too greatly displaced the potential difference between the two carbons will rise, causing an extra energizing of the coil S, tending to bring the arc back to its former position. This, in fact, is the principle of my invention—to differentiate the effects of two deflecting-coils upon an arc for any purpose whatsoever, whereby an increase or extension of the arc in one direction of deflection may be met by an opposing influence depending on the potential difference between the electrodes forming the arc. I have found this principle particularly useful in applying the arc to blowpipe work or deflecting an arc for blowpipe purposes. It may be carried out as in Figs. 2 and 3, where (in Fig. 2) the carbons are in the same line with the arc between them, the latter being deflected outward by the magnetic effect of the two poles M M' inclosing the arc. These poles are part of a horseshoe or other magnet, upon which are wound two sets of coils, one set in series with the arc or dependent in its action on the series current, and the other coil or set of coils is in derived circuit around the arc or dependent either directly or indirectly for its energizing action upon the potential difference. By selecting the relative magnetizing actions of the two coils, whether the current supplied be alternating or direct in character, a proper displacement of the arc may be maintained which is not likely to become excessive, as would be the case if either the series or shunt coil alone were used as the deflecting agent.

Fig. 3 shows the carbons placed parallel to each other with the arc deflected downward between the poles M M', and the arrangement would be the same in essence as before.

Figs. 4 and 7 indicate the preferred placing of the coils where the carbons are parallel and are to be used for illuminating purposes, Fig. 7 being a plan view of the arrangement shown in Fig. 4. Here the combined coils C S are duplicated on the two sides of the arc, as shown in the plan, and the carbons extend down between them. The direction of the current in the series coil C or coil dependent on the series current is such as to carry the arc downward and tend to project it from the points of the carbons at their lower ends, while the effect of the current in the coils S S is to counteract this tendency when it has too great a value and to counteract it according to the potential difference developed between the carbons. In this way the arc can be kept at a particular point of displacement at the ends of the carbons where it should be maintained, and the latter become an effective source of light. The magnetic effect is much the same as if a permanent magnet, as in Figs. 5 and 6, were so placed as to inclose the electrodes and the magnetism given such a direction as to tend to expel the arc from their lower extremities. The permanent magnets are represented in the figure by the bent piece M M', between the legs of which are the electrodes supplied with current in any ordinary way.

It will of course be manifest that where one of the coils, such as the series coil, has a constant magnetic effect or generates a substantially constant magnetic field (as would be the case in ordinary series arc-lamp circuits where the current is maintained constant) its place may be taken by a permanent magnet furnishing a field of substantially the same intensity. Inasmuch as the magnet could not furnish a variable field or vary in accordance with the potential across the arc it could not replace the potential coil or shunt field. In the sense and to the extent described, therefore, the permanent magnet would be an equivalent of the electromagnetic device furnishing one of the fields.

Circuit connections which may be employed in my invention are shown in Fig. 8, the plane of the electrodes with respect to the coils being, however, at right angles, as in Fig. 4 or 7, the arrangement shown in Fig. 8 being adopted for clearness of illustration. In this case a set of mains $a\ b$ have branches taken through the arcs at A A'. Leaving the main $a$, for example, a line extends through an inductive coil I, the self-induction of which can be regulated or which is automatically regulated by any known means, as by a movable core II and a lever controlling it. After passing the coil I the line is carried through the coil C, through the arc at A, and back to main $b$, forming the series connection. In addition to this the coil S is connected across the arc or from carbon to carbon in derived circuit, and means may be provided, if desired, for regulating the current in the coil S, as by another self-inductive coil I' and regulating-core II'. This of course assumes that alternating currents are employed. The self-inductive coils may also be employed to adjust to a certain extent the phase relations of the two coils or circuits. It is desirable, however, that the circuit of the coil S have a high resistance, so that only a small fraction of the current shall pass through it, and being wound differentially to coil C its action is opposite thereto and affects the arc, as has already been explained. Instead of self-inductive arrangements for regulating the current strengths in the two circuits resistance may be employed and would be used in case the current was continuous. This is illustrated in the right-hand portion of Fig. 8 by R R', the resistance R being in circuit with the coil C' and the arc A', while R' is in the derived-circuit-coil branch S'.

In Fig. 9, $a\ b$ are, as before, the mains, and connections are taken from them through two coils C C, applied adjacent to the arc. Coils S S in derived circuit with means, such as I and R', for adjusting the current strengths are also shown. In addition the current may traverse an electromagnet-coil M in series with the arc, the function of which is to start the arc by withdrawing a third electrode $e$, which, when no current is passing, rests at the ends of and connects the vertical carbons seen above it. The electromagnet-coil M is provided with a core attached to the third electrode $e$, pulling it down on the first passage of the current, thus establishing an arc between the two vertical carbons, after which the current through the coils C C passes in series with the arc, while the current in S S is in derived circuit to it. The position of the carbons is at right angles to the proper one, this position being adopted for clearness, the plan view, Fig. 10, showing the two carbons E E' properly mounted in a plane parallel to the coils C S C S. In this case the carbons may be mounted in an inclosing globe, as shown at G, Fig. 11, which shuts off the access of air and retards the combustion. The carbons are thus maintained in the interior of the globe and their combustion is therefore very slow. The regulation of the arc in this position at the ends of the carbon is, as before, effected by the electromagnetic actions of the two circuits passing through the coils C S acting differentially.

In Fig. 12 I show the modification necessary in the application of the invention to a three-phase circuit. In this case three branches from three mains $a\ b\ c$ in three-phase relation are taken through proper regulating-coils and through separate coils C C C, each one of which terminates in a carbon pencil, as at A. In three-phase relation from these circuits from pencil to pencil are connected the coils S S S, of fine wire and high resistance, differentially wound and placed, as in Fig. 4, relative to the coils C C C. The carbons A, while shown in line, are disposed, as shown in plan in Fig. 14, at the three corners of a triangle, and the compound coils, as C S, are similarly disposed in triangular arrangement, as in Fig. 14, only one coil being seen in Fig. 13. In this case a three-phase arc is produced at the ends of the three carbons and is maintained in its position at the ends by the action of the three-phase compound coils, each pair of carbons having, as it were, its own arc controlled by the coil whose plane is coincident with the plane of the pair, and as the arc shifts or rotates around this controlling action is taken up successively by each of the sets of coils in the triangular relation. An inclosing globe, as before, may be used to protect the arc and prevent too-rapid combustion of the carbons, and a starting third terminal $e$ may be employed, actuated by one of the circuits and by an electromagnetic coil therein to start the arc at the beginning of the lighting, as in Fig. 9.

What I claim as new, and desire to secure by Letters Patent of the United States, is—

1. The improvement in the art of regulating or controlling electric arcs, which consists in subjecting the arc to the directive influence of a resultant field of force produced by a plurality of magnetic or electromagnetic devices, the lines of force from some of which tend to drive the arc in one direction, while those from other devices act to oppose or modify the action of the first named.

2. The improvement in the art of regulating or controlling electric arcs, which consists in subjecting the arc to the directive influence of a resultant field of force produced by a plurality of electromotive-force devices, some of which are dependent for their action upon the current flowing in series with the arc, and the lines of force from which tend to drive the arc in a given direction, the others of which oppose the first-named devices and depend for their action upon the potential existing around the arc.

3. In combination, terminals or electrodes at which an arc is to be maintained, electromagnetic devices in series with the arc generating lines of force tending to drive the arc in a given direction, and other devices in shunt to the arc, the lines of force from which tend to oppose or modify the action of those from the first-named devices.

4. In combination, terminals or electrodes at which an arc is to be maintained, a coil or coils in series with the arc, generating lines of force tending to drive it in a given direction, and another coil or set of coils in shunt to the arc generating lines of force which tend to oppose or modify the action of those from the first-named coils.

5. In combination, terminals or electrodes at which an arc is to be maintained, a coil or coils in series with the arc generating lines of force tending to drive it in a given direction, another coil or set of coils in shunt to the arc generating lines of force which tend to oppose or modify the action of those from the first-named coils, and an arc-striking means controlled by the series current.

In witness whereof I have hereunto set my hand this 23d day of June, 1896.

ELIHU THOMSON.

Witnesses:
JOHN W. GIBBONEY,
HENRY M. HOBART.